US007021340B2

(12) United States Patent
Mayster (10) Patent No.: US 7,021,340 B2
(45) Date of Patent: Apr. 4, 2006

(54) METHOD OF AND LOOM FOR TEACHING BRAILLE

(75) Inventor: Jennifer J. Mayster, Chevy Chase, MD (US)

(73) Assignee: Blind Faith School of Music and Art, Chevy Chase, MD (US)

( * ) Notice: Subject to any disclaimer, the term of this patent is extended or adjusted under 35 U.S.C. 154(b) by 41 days.

(21) Appl. No.: 10/895,876

(22) Filed: Jul. 20, 2004

(65) Prior Publication Data

US 2006/0016503 A1    Jan. 26, 2006

(51) Int. Cl.
*D03D 41/00* (2006.01)
*B41J 3/32* (2006.01)

(52) U.S. Cl. ............................ 139/33; 139/29; 139/11; 400/109.1; 400/483; 434/113; 434/115; 434/114

(58) Field of Classification Search ................... 139/11, 139/29, 33; 400/109.1, 483; 434/113–115
See application file for complete search history.

(56) References Cited

U.S. PATENT DOCUMENTS

| 263,795 | A | | 9/1882 | Melzer | |
|---|---|---|---|---|---|
| 634,681 | A | | 10/1899 | Brindle et al. | |
| 1,822,938 | A | * | 9/1931 | Smith | 400/109.1 |
| 2,167,193 | A | * | 7/1939 | Wessborg et al. | 139/33 |
| 2,866,069 | A | | 12/1958 | Smythe | 139/11 |
| 3,998,246 | A | * | 12/1976 | Strousser | 139/1 R |
| 4,194,190 | A | * | 3/1980 | Bareau | 340/407.2 |
| 4,277,239 | A | * | 7/1981 | Genis | 434/115 |
| 4,473,356 | A | * | 9/1984 | Fernando et al. | 434/114 |
| 4,519,781 | A | * | 5/1985 | Boyd | 434/156 |
| 4,551,102 | A | * | 11/1985 | Meinzer | 434/114 |
| 4,608,939 | A | * | 9/1986 | Lampley | 112/260 |
| 5,108,290 | A | * | 4/1992 | Eriksson | 434/114 |
| 5,113,612 | A | * | 5/1992 | Machen | 40/336 |
| 5,346,571 | A | * | 9/1994 | Condon et al. | 156/212 |
| 5,574,830 | A | * | 11/1996 | Quzilleau | 358/1.3 |
| 5,650,217 | A | * | 7/1997 | Skrivanek et al. | 428/195.1 |
| 5,839,215 | A | * | 11/1998 | Lasprogata | 40/299.01 |
| 6,271,453 | B1 | * | 8/2001 | Hacker | 84/476 |
| 6,320,496 | B1 | * | 11/2001 | Sokoler et al. | 340/407.1 |
| 6,340,957 | B1 | * | 1/2002 | Adler et al. | 345/1.3 |
| 6,398,435 | B1 | * | 6/2002 | Kozakai et al. | 400/144.2 |
| 6,402,403 | B1 | * | 6/2002 | Speakman | 400/120.03 |
| 6,419,497 | B1 | * | 7/2002 | Carlson | 434/367 |
| 6,481,134 | B1 | * | 11/2002 | Aledo | 40/661.09 |
| 6,881,063 | B1 | * | 4/2005 | Yang | 434/114 |
| 6,930,590 | B1 | * | 8/2005 | Ling et al. | 340/407.1 |
| 6,949,290 | B1 | * | 9/2005 | Schaeffeler et al. | 428/411.1 |

* cited by examiner

*Primary Examiner*—John J. Calvert
*Assistant Examiner*—Robert Muromoto
(74) *Attorney, Agent, or Firm*—Finnegan, Henderson, Farabow, Garrett, & Dunner LLP (57) ABSTRACT

Embodiments disclosed herein relate to a method of and loom for teaching Braille by weaving with a loom, wherein the levers to move the harnesses are shaped and spaced like the levers on a Perkins Brailler (a Braille typewriter).

20 Claims, 9 Drawing Sheets

METHOD OF AND LOOM FOR TEACHING BRAILLE

BACKGROUND

Technical Field

Embodiments disclosed herein relate to a method of and loom for teaching Braille by weaving with a loom, wherein the levers to move the harnesses correspond to the keys on a Perkins Brailler (a Braille typewriter).

Figure 1:
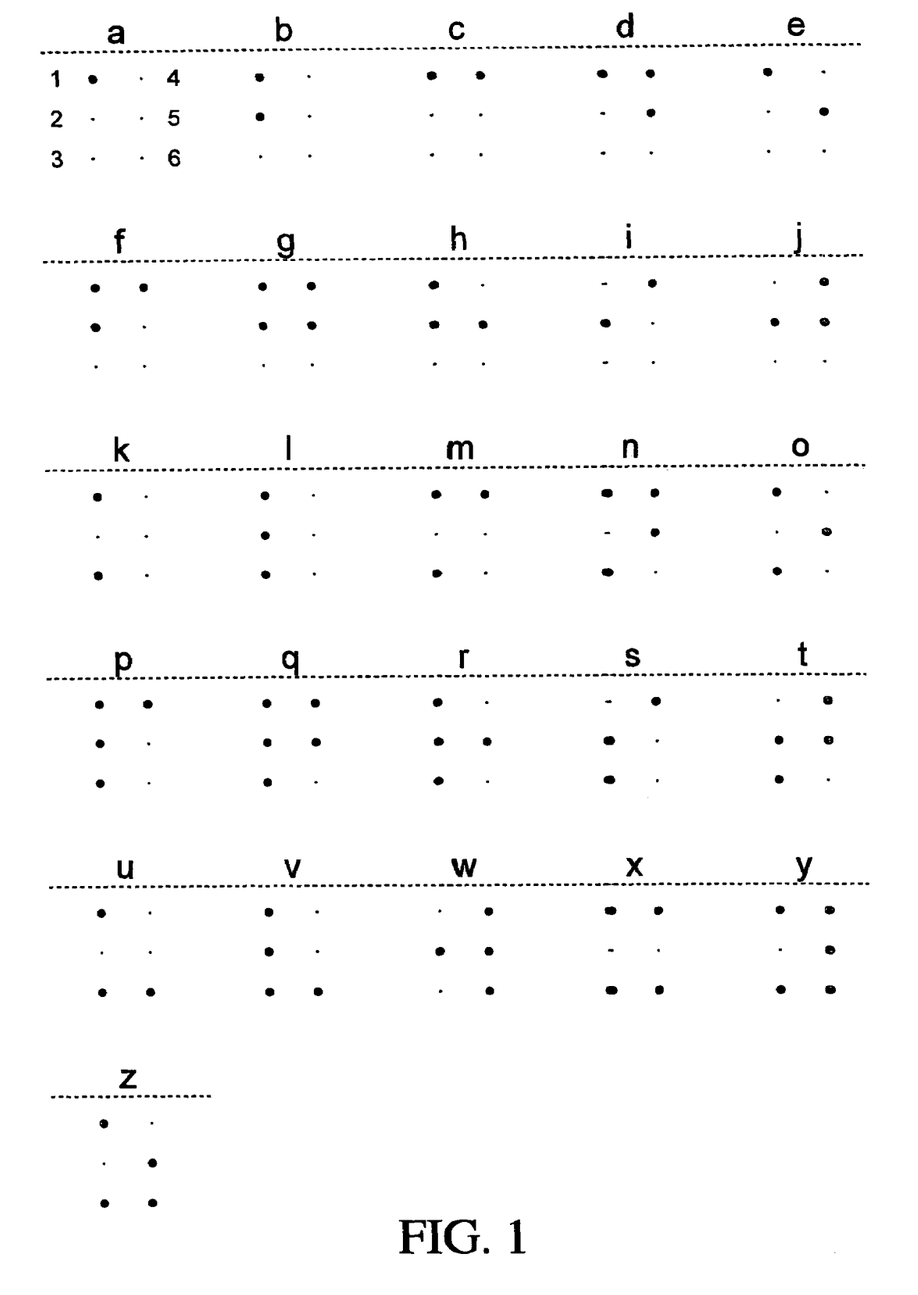
FIG. 1 illustrates the Braille cells for the English alphabet.
Figure 2:
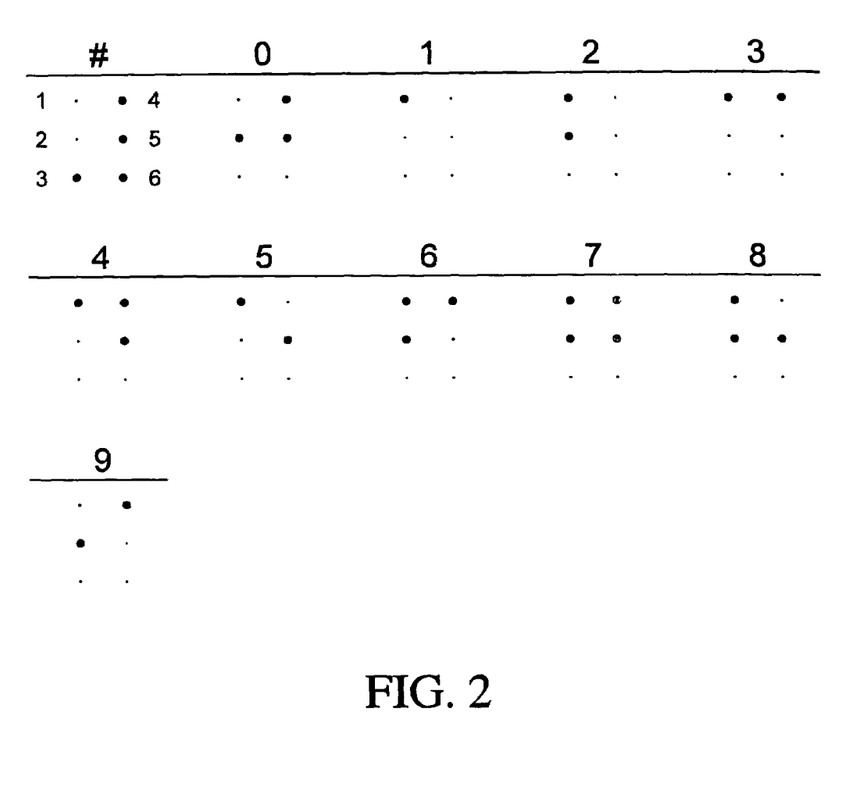
FIG. 2 illustrates the Braille cells for numbers.

The National Federation for the Blind estimates that 1.1 million people are blind in the United States. Fortunately the blind have several options these days for reading and recording written material. In the past, only learning Braille, a system of six raised dots invented by Louis Braille, enabled one to read words, and mathematics or music symbols. FIG. 1 illustrates the alphabet in Braille. FIG. 2 illustrates the numbers 0–9 in Braille. Words do not always have to be Brailled letter for letter. Many words have contracted or short-form representations in Braille. An excellent reference of commonly used Braille representations of words is *The Braille Enthusiast's Dictionary* by Alan J. Koenig and M. Cay Holbrook, which is incorporated herein by reference.

Figure 3:
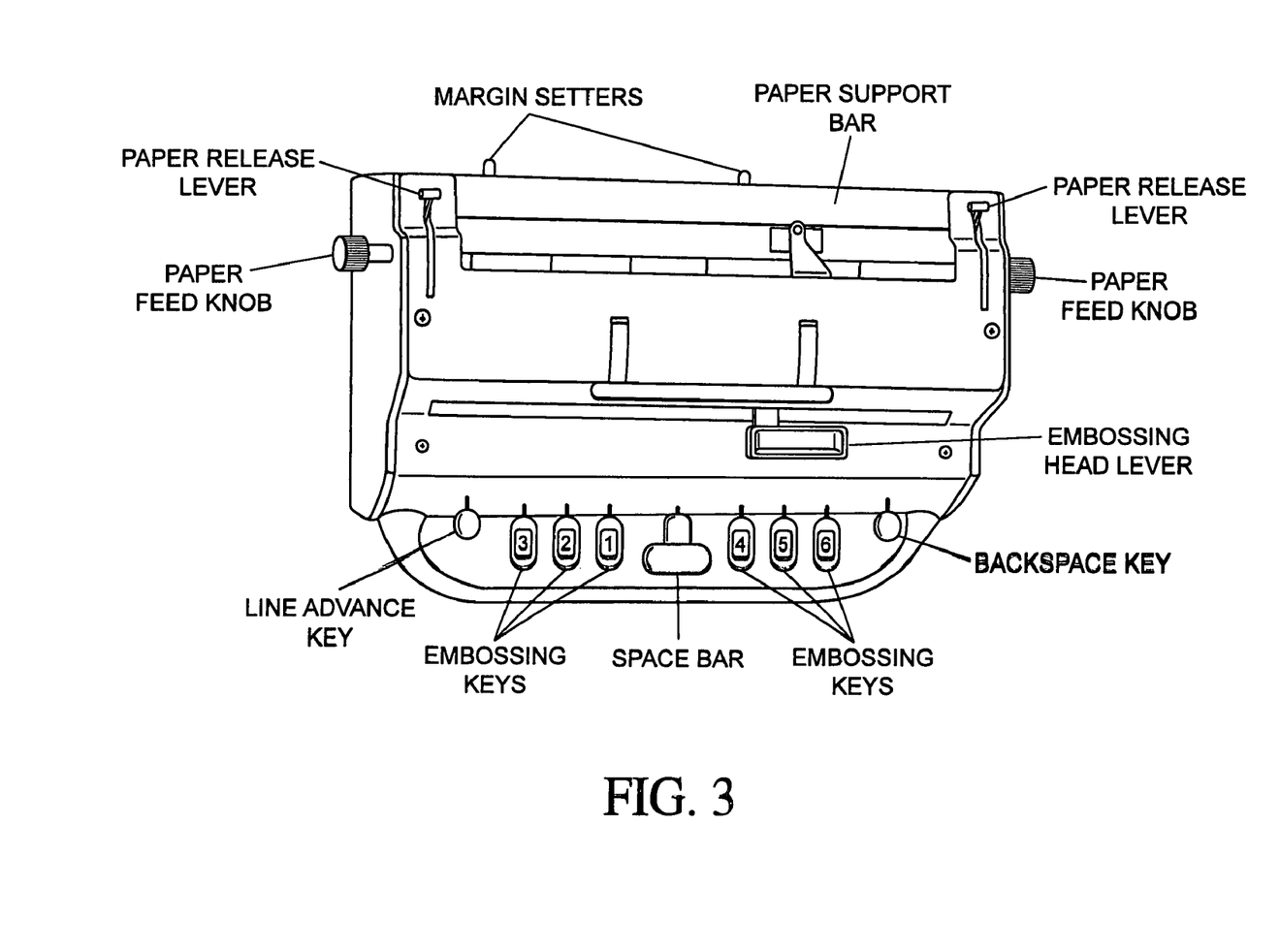
FIG. 3 is a top view of a Perkins Brailler.

David Abraham, a wood-working teacher at the Perkins School for the Blind invented a Braille typewriter in 1951, called the Perkins Brailler. As illustrated in FIG. 3, the Perkins Brailler is configured with six keys and a spacer bar: three keys to the left of the spacer bar and three keys to the right of the spacer bar. FIG. 3 is a top view of a Perkins Brailler. The three keys to the left of the spacer bar make the raised dots in positions three, two, and one, (from left to right), respectively. The three keys to the right of the spacer bar make the raised dots in positions four, five, and six (from left to right), respectively. Each of the six keys is just under ¾ inch wide, and the spacer bar is 1¾ inches wide. The keys are 1 inch apart between centerlines, and the centerlines of keys #1 and #4 are 1½ inches from the centerline of the spacer bar.

Recently technology advances have enabled electronic word files to be transposed into a spoken voice, which "reads" the text file to the user. A person may also create an electronic data file by use of available software that transcribes the spoken word of the user into a text file. With such advances, the incentive to learn Braille has diminished, and as a result, so has the Braille literacy rate.

Twenty years ago in the 1980's forty percent of the blind could read Braille. Today, Braille literacy rates have dropped to ten percent. Because many Braille resources still exist and Braille is in public use in, for example, ATMs, or elevators, the blind still need to know Braille. Additionally, the blind need the ability to quickly create their own Braille documents, and thus the skill of typing in Braille is desirable to have. There is a need for a fun way to learn how to type Braille, which also allows the student to practice his or her knowledge of Braille.

The other background for understanding this invention is weaving on looms. Weaving is accomplished by passing a crosswise thread in a predetermined perpendicular pattern under and over lengthwise threads. Looms increase the efficiency of weaving by providing a loom frame that supports a plurality of lengthwise threads (called warp threads). The warp threads are threaded through loops (called heddles) made of wire or string, which may be attached between top and bottom rods or bar members of a harness. When the harness is raised or lowered, it accordingly raises or lowers the attached heddles the same distance, which pull the warp threads threaded through the heddles apart from the other warp threads, creating a sometimes triangular-cross-sectioned space (called a shed) through which to pass the crosswise thread (called the weft). This eliminates the need to move the weft up and over and down an under warp threads. Instead, the weft thread is wound on a shuttle which is passed from one hand to the other through the shed created by the separated warp threads. A good reference book of weaving, which is incorporated by reference, is *Ward and Weave* by Robert LeClerc available from LeClerc Looms of Canada.

At least two harnesses are needed to weave: one to raise a set of warp threads, the other to raise the remaining set of warp threads. However, most looms have at least four harnesses. Commonly, the number of harnesses available on looms increases in multiples of four.

Each harness is attached to an actuator. It is the actuator that the loom operator moves in order to raise or lower the attached harnesses, thereby separating the selected set of warp threads from the remaining warp threads. In weaving vernacular, if the actuator is mounted up top or on the side, it is referred to as a "lever." If it is down below the warp, it is referred to as a treadle. A thin, flexible and strong member, such as cording, is often used to tie an actuator to one or more harnesses. Looms that may be used on a table are referred to as table-top looms and most often have top or side levers. Floor looms, so named because they are set up on the floor, most often have treadles that are connected to the harnesses and the treadles are normally operated by foot rather than hand.

Figure 4:
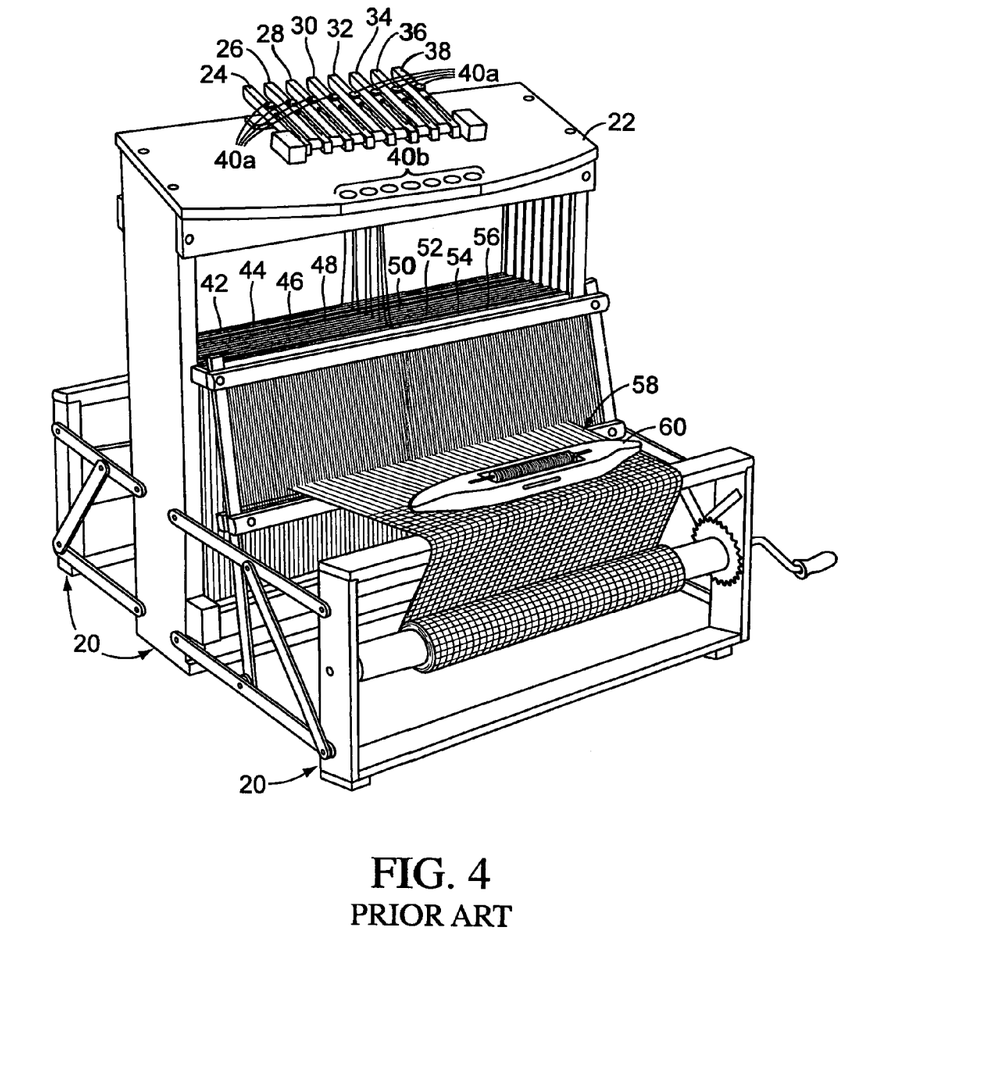
FIG. 4 illustrates a LeClerc, "Voyager" 8 shaft, table-top loom.

LeClerc Looms makes a portable, table-top loom called the Voyager. It is sold with or four and eight harnesses. Each harness is referred to as a "shaft," and thus the Voyager is offered in both a four and eight "shaft" model. An eight "shaft" model is illustrated in FIG. 4. A loom frame 20 may include a top board 22 with eight levers 24–38. Each lever is rotatable about a bar from the back of top board 22 to the front of top board 22 and is securable by magnetic forces operating between the magnets 40a and 40b: one magnet 40a in the lever and one magnet 40b directly below it in the top board 10. Each lever is tied to a harness 42–56. Each harness has heddles through which the warp threads 58 are threaded. By rotating a lever, the harness 42–56 to which it is attached is raised, pulling the desired warp threads apart from the remainder. A shuttle 60 may then be passed from one side to the other through a shed (not shown) formed by the separated warp threads (not shown). LeClerc and other loom making companies, such as, for example, Schacht, Louet, and Ashford, all sell four- or eight-"shaft" (or even twelve), table-top looms with levers up top or on the side.

SUMMARY

As embodied and broadly described herein, an embodiment consistent with the invention is a loom for practicing typing in Braille, which includes a loom frame for supporting a plurality of warp threads. The loom also includes a plurality of heddles, wherein at least one of the plurality of warp threads may be threaded through each heddle. The loom also includes seven harnesses, each of the seven harnesses with at least one of the plurality of heddles being attached thereto and arranged to be raised and lowered relative to the frame. The loom also includes seven levers, each one of the levers being attached to a separate one of the seven harnesses for raising and lowering the harness, wherein a movement of a lever causes the harness and the at least one heddle attached thereto to be raised, separating the at least one warp thread, when threaded through the at least one heddle, from the remainder of the warp threads, thereby creating a shed. The seven levers are arranged in a row with a center lever, the center lever having a width greater than any other one of the seven levers. The loom also includes a shuttle having a weft thread wound thereon and arranged to be passed through the shed.

Other embodiments consistent with the invention are methods of using a loom to teach Braille, to practice typing Braille, to practice Braille, to transcribe language into woven fabrics, to encode messages into woven fabrics, to encode mathematics into woven fabrics, and to transcribe music pieces into woven fabrics.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments consistent with the invention and together with the description, serve to explain the principles of the invention. In the drawings.

DESCRIPTION OF EMBODIMENTS

Reference will now be made in detail to the exemplary embodiments consistent with the invention, examples of which are illustrated in the accompanying drawings. Wherever possible, the same reference numbers will be used throughout the drawings to refer to the same or like parts.

Figure 5:
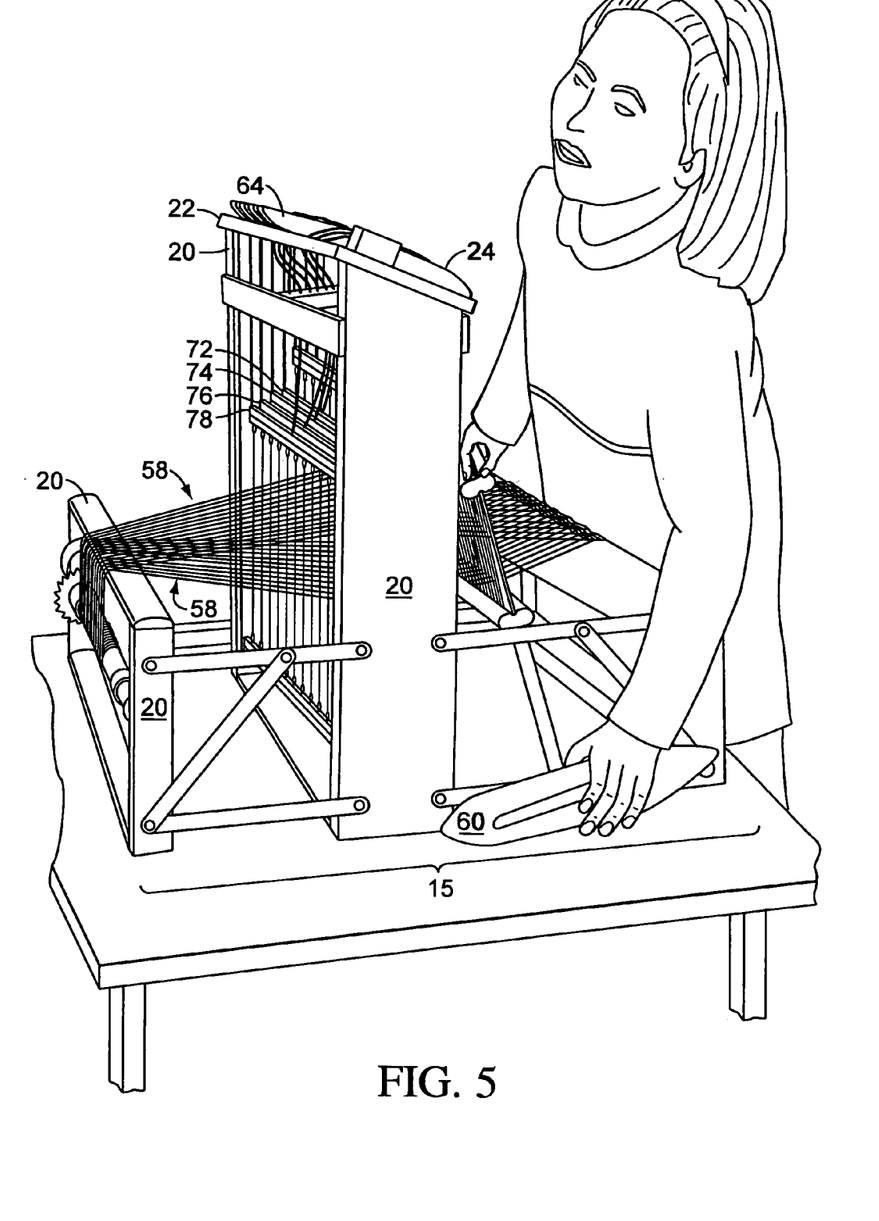
FIG. 5 depicts an embodiment of a loom consistent with the invention.

An embodiment consistent with the invention is depicted in FIG. 5. A loom 15 as depicted in FIG. 5 is a modified Voyager-style, table-top loom manufactured by LeClerc Looms of Canada. As here embodied, loom 15 has seven harnesses. As here embodied, each harness is tied to a separate one of the seven top levers, which are best illustrated in FIG. 6.

In this embodiment, the seven levers are in a row with a center lever 64, the center lever 64 having a width greater than any other one of the seven levers (levers 24, 26, 28, 34, 36, and 38). It is helpful to have the levers constructed in this manner so as to give blind loom operators the ability to locate the center lever by feel as well as by counting. In this embodiment, levers 24, 26, 28, 34, 36, and 38 are ½ inch wide, and the center lever 64, is ¾ inch wide. The width of the center lever may be equal to the width of the center spacer bar of a Perkins Brailler. As here embodied, levers 24, 26, and 28 are disposed in a first group on one side of center lever 64 and levers 34, 36, and 38 are disposed in a second group on the other side of center lever 64. Six of the seven levers may be symmetrically disposed with respect to a lengthwise centerline of the seventh and center lever. In this embodiment, levers 24, 26, 28 in one group and levers 34, 36, and 38 in the second group are each on a one inch lengthwise centerline spacing from the next ½ inch lever, and levers 28 and 34 each have 1¼ inch between their lengthwise centerlines and the lengthwise centerline of the center lever 64. The seven levers may be spaced from each other in the same relative spacing as the six keys that produce the raised dots in a Braille cell and the center spacer bar of a Perkins Brailler.

Figure 6:
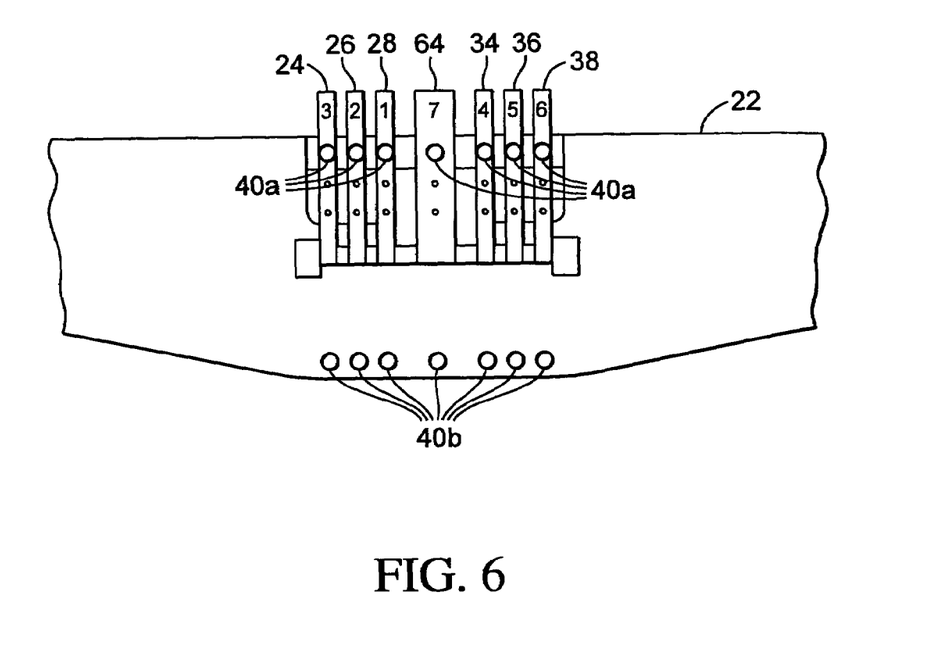
FIG. 6 is an enlarged view of the seven levers of the loom of FIG. 5.

As shown in FIG. 6, seven levers, as here embodied, are positioned in the following order: three (lever 24), two (lever 26), one (lever 28), seven (lever 64), four (lever 34), five (lever 36), six (lever 38). This matches the arrangement of the six keys and spacer bar of a Perkins Brailler: lever 24 corresponds to the number three key of a Perkins Brailler, which produces the bottom left raised dot in a Braille cell, or in other words, dot #3; lever 26 corresponds to the number two key of a Perkins Brailler, which produces the middle left raised dot in a Braille cell, or in other words, dot #2; lever 28 corresponds to the number one key of a Perkins Brailler, which produces the top left raised dot in a Braille cell, or in other words, dot #1; lever 64 corresponds to the spacer bar of a Perkins Brailler, which advances the paper the width of a Braille cell; lever 22 corresponds to the number four key of a Perkins Brailler, which produces the top right raised dot in a Braille cell, or in other words, dot #4; lever 24 corresponds to the number five key of a Perkins Brailler, which produces the middle right raised dot of a Braille cell, or in other words, dot #5; and lever 26 corresponds to the number six key of a Perkins Brailler, which produces the bottom right raised dot in a Braille cell, or in other words, dot #6.

Figure 7:
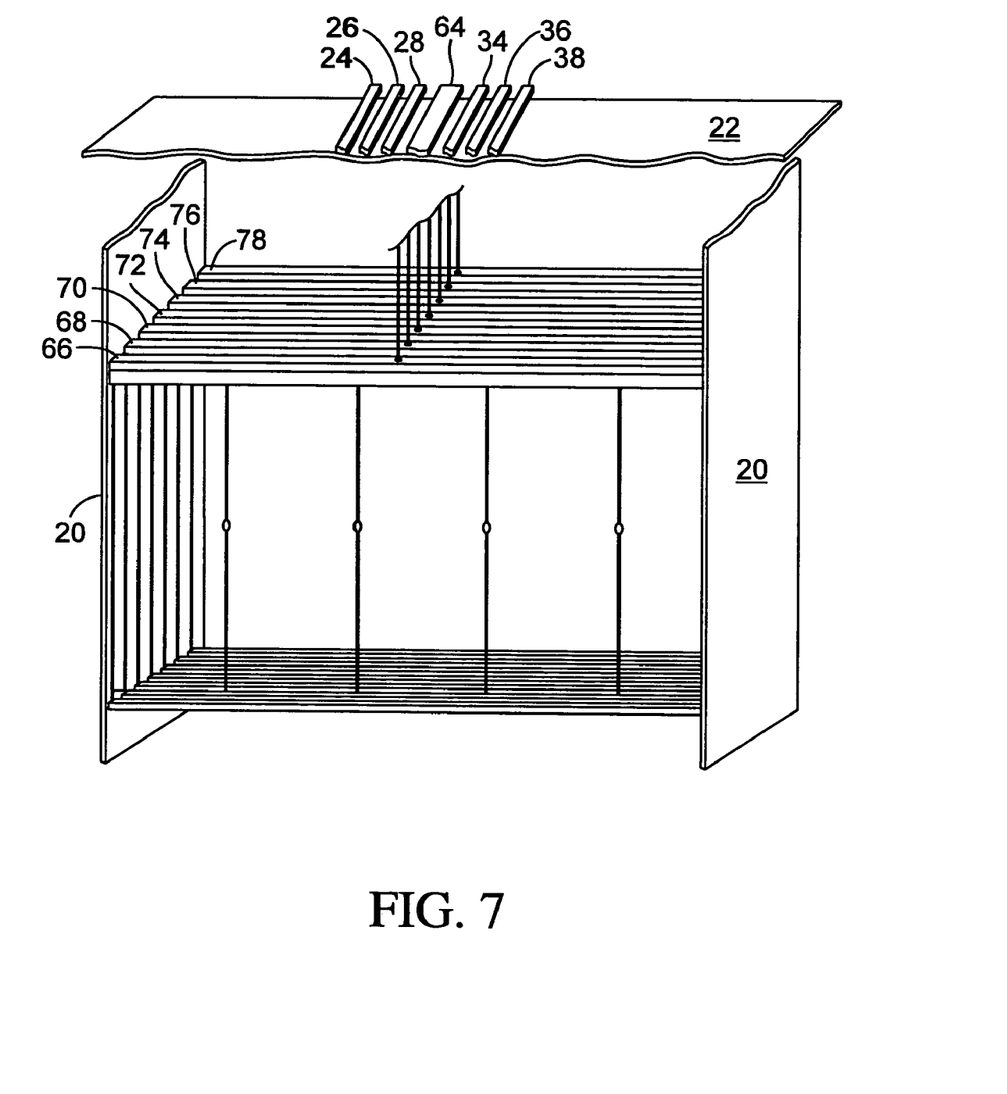
FIG. 7 is a partial front perspective view of the loom of FIG. 5 with heddles only on one harness.

Preferably, each one of the seven levers is attached to a separate one of the seven harnesses. The seven harnesses, as illustrated in FIG. 7, may be disposed in vertical planes, one behind one another. Preferably, lever 28 may be connected to harness 66 closest to the front of the loom. Preferably, lever 26 may be connected to harness 68 second closest to the front of the loom. Preferably, lever 24 may be connected to harness 70 third closest to the front of the loom. Preferably, lever 64 may be connected to harness 78 closest to the back of the loom. Preferably, lever 64 may be connected to harness 78 seventh closest to the front of the loom. Preferably, lever 34 may be connected to harness 72 fourth closest to the front of the loom. Preferably, lever 36 may be connected to harness 74 fifth closest to the front of the loom. Preferably, lever 38 may be connected to harness 76 sixth closest to the front of the loom.

Each of the seven harnesses is attached to at least one heddle, through which at least one warp thread may be threaded. FIG. 7 illustrates four heddles attached to harness 66. Optionally, a weaver may choose to install more heddles on a harness than the weaver plans to thread for ease of resuming weaving if a heddle should break during a weaving. Preferably, the number of heddles on each harness is equal to or greater than the total number of warp threads divided by seven.

Figure 9:
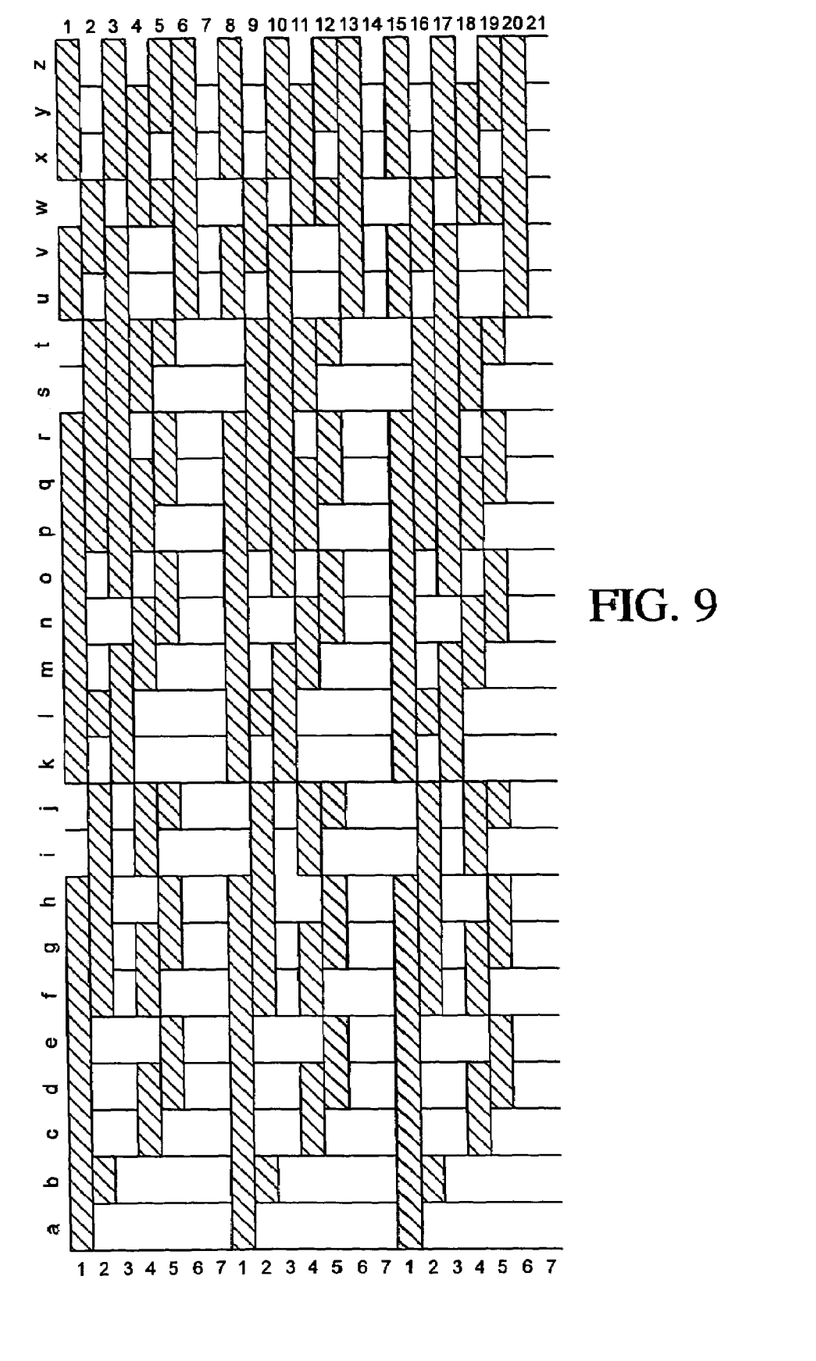
FIG. 9 is a schematic of the weaving pattern of part of the fabric of FIG. 8.

FIG. 9 illustrates the preferred threading pattern of an exemplary 21 warp thread workpiece. The numbers along the top count the warp threads from left to right (1 to 21) and the numbers along the bottom correspond to the particular lever that raises this warp thread apart from the other warp threads. Preferably, the first warp thread from the left and every successive seventh warp thread from the left should each be threaded through a separate heddle attached to harness 66 connected to lever 28. Preferably, the second warp thread from the left and every successive seventh warp thread from the left should each be threaded through a separate heddle attached to harness 68 connected to lever 26. Preferably, the third warp thread from the left and every successive seventh warp thread from the left should each be threaded through a separate heddle attached to harness 70 connected to lever 24. Preferably, the fourth warp thread from the left and every successive seventh warp thread from the left should each be threaded through a separate heddle attached to harness 72 connected to lever 34. Preferably, the fifth warp thread from the left and every successive seventh warp thread from the left should each be threaded through a separate heddle attached to harness 74 connected to lever 36. Preferably, the sixth warp thread from the left and every successive seventh warp thread from the left should each be threaded through a separate heddle attached to harness 76 connected to lever 38. Preferably, the seventh warp thread from the left and every successive seventh warp thread from the left should each be threaded through a separate heddle attached to harness 78 connected to lever 64.

Other threading patterns are possible, however if all looms are threaded this way, then weaving a common sequence of levers will present a woven fabric of the same pattern each time, and one which mirrors the keys depressed on a Perkins Brailler for each desired cell. Another preferred threading is similar to the preferred threading discussed above, but instead of just one warp thread through each heddle, two warp threads are threaded through each separate heddle, thus doubling the number of warp threads in the example from 21 to 42 without increasing the number of heddles used.

A loom consistent with the invention could also have the seven levers positioned in other orders, as the order in FIG. 5 is merely preferred. The spacing of the levers may be varied. The seven levers could all be the same width and spaced the same distance apart, or they could vary in widths and spacing. Preferably, they may be in two groups of three, one group on each side of the seventh lever. Preferably, the seventh lever is wider than the other six levers. Preferably, the widths of the levers match those of a Perkins Brailler, and the relative spacing of the levers matches that of the keys and spacer bar of a Perkins Brailler. However, if larger or smaller levers are desired, the levers could be scaled appropriately, keeping the relative spacing of a Perkins Brailler.

Moreover, a loom consistent with the invention could also have more than seven levers, with each lever connected to a harness. However, the placement of the additional levers should be far enough away to clearly distinguish the seven levers used to correspond to the six keys and the spacer bar of a Perkins Brailler. The additional harnesses could also contain threaded heddles, but the warp threads that they pull, if not one of the first seven threads, would require the spacing for any set pattern of the first seven harnesses to accommodate the extra threads before repeating. In other words, if there are eight harnesses with threaded heddles, instead of every successive seventh warp thread from the left being threaded through a heddle on a harness, every successive eighth warp thread from the left should be threaded through a heddle on a harness.

Though the preferred embodiment is a table-top loom with top levers, a loom with at least seven treadles, each connected to a separate harness and corresponding to one of the six keys and the spacer bar of a Perkins Brailler, may also be an embodiment consistent with the invention. At most two treadles may be depressed with one foot, so that a single operator would be unable to hold down more than four treadles of the loom with his or her feet. However, two operators sitting side by side could operate each operate three treadles, thus could operate all seven of the levers of the loom together, one being responsible for levers one through three and one being responsible for levers four through six and either pressing the seventh lever when a "space" is woven.

A loom consistent with the invention can also be used to teach Braille, among other things. Other exemplary uses for such looms include practicing Braille, practicing typing Braille, transcribing language into woven fabrics, encoding messages into woven fabrics, encoding mathematics (the Nemeth code of Braille) into woven fabrics and transcribing music pieces into woven fabrics.

An embodiment consistent with the invention is a method of teaching Braille. One such exemplary method includes presenting the numbering system of the six raised dots in a Braille cell, and then selecting one or more characters of which to teach the Braille representation. The numbering system of the six raised dots in a Braille cell is depicted in FIG. 1. The numbers of the raised dots present in each Braille cell representing the one or more characters may be presented to the student. Then the student may be instructed to move the levers on a loom that correspond to the raised dots in the first Braille cell presented. For instance, referring to FIG. 6, a "b" would require two levers to be rotated and secured, lever 28 and lever 26, because dots #1 & 2 of the Braille cell form the letter "b." Moving the lever raises the harness, which is connected to one or more threaded heddles. Moving the lever raises the harness causing the warp threads in the heddles to separate according to the chosen pattern. The student may then be instructed to pass a shuttle 60 (illustrated in FIGS. 4 and 5) having the weft thread wound thereon through the shed formed by the separated warp threads 58, and then release the levers. The student may then be instructed to rotate the levers for the next Braille cell and then pass the shuttle the opposite direction through shed formed by the separated warp threads. The instructor may wish to personally verify the woven pattern after each weft thread that is added, or instruct the student to verify that the weft thread goes over and under the proper warp threads. Verification may be by sight or by feeling the number and location of warp threads exposed on the top of the woven fabric or by unweaving according to the Braille pattern. If the same Braille cell is to be repeated, to avoid having the weft thread from the previous pass be unwoven, another set of warp threads could be woven in between the repeated letters. To accomplish this, the lever corresponding to the space bar of a Perkins Brailler may be rotated and secured and the shuttle is passed through a shed created by the separated warp threads.

Figure 8:
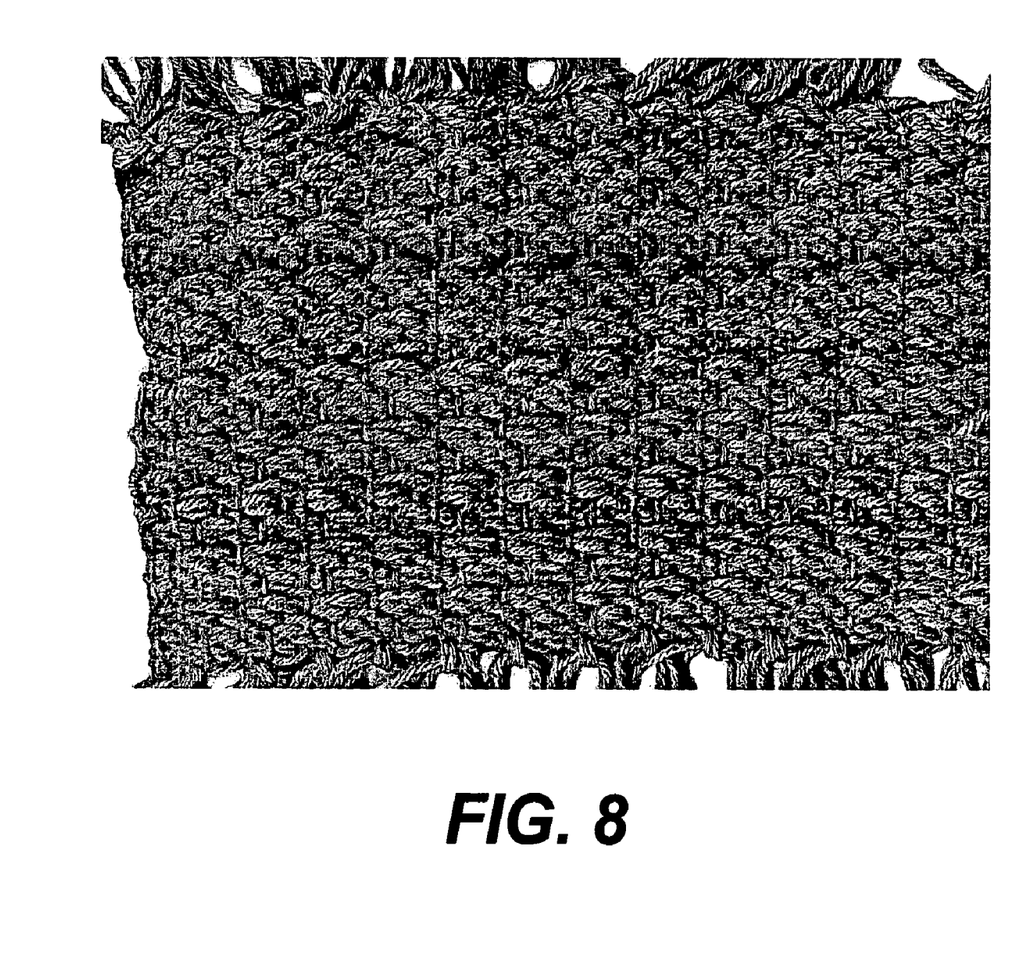
FIG. 8 an example of a fabric made by weaving the Braille alphabet 4 times on a loom of FIG. 5.

An exemplary exercise would be to weave the letters of the alphabet in order. FIG. 8 illustrates the Braille alphabet woven 4 times with the preferred threading as described above. FIG. 9 is an illustration of the woven pattern of part of the fabric of FIG. 8, showing Braille cells for letters a through z woven with the preferred threading. The vertical threads are the warp threads and the horizontal threads are the weft threads.

A multitude of variations of this exercise can be devised including, for example, separating each weft thread woven in a pattern corresponding to a Braille cell by one or more weft threads woven using a harness not connected to one of the levers corresponding to the six raised dots of a Braille cell. Other alternatives include creating the capitalized letter followed by the lower case letter for each letter of the alphabet. For the improved ability to verify that a student has selected the correct set of levers for a desired Braille cell, the student may be instructed to repeat the letter, contraction or symbol a set number of time before selecting another to practice.

Because beginning blind weavers have an increased chance of breaking warp threads, it is of benefit to prepare the loom with double strung warp threads. Thus if one of the warp threads breaks, the student may still be able to weave and verify a correct or pattern.

Another embodiment consistent with the invention includes a method of transcribing a musical composition into woven fabric. Music may be represented in Braille. Thus one may transcribe a music composition into woven fabric by selecting a musical composition and determining what note is to be transcribed first. The particular dots that are raised in each Braille cell representing the musical note are determined and the one or more levers connected to harnesses of a loom, which correspond to the raised dots present in the Braille cell to be transcribed are moved to separate the warp threads. The levers are preferably ordered to match the order of the six keys a Perkins Brailler that create the raised dots of a Braille cell. A shuttle with weft thread is passed through the shed created by the separated warp threads, weaving a pattern that is a transcription of the Braille cell. This process is repeated for each note in the musical composition to be transcribed.

If desired, an intermediate weaving pattern lever may be secured and a weft thread woven in that pattern by being passed through the shed created by the separated warp threads at least one way, one time, between the weft threads woven in the patterns corresponding to the Braille cells. This may be done in order to demarcate the weft thread(s) woven in the pattern corresponding to the Braille cells for ease of detecting the correctness of each woven "Braille cell" or to create a desired pattern. It is preferred that this intermediate weaving pattern is an additional weaving pattern created by a seventh (or greater) lever, harness and corresponding heddles, so that its pattern is not confused with a weaving pattern corresponding to a Braille cell.

Another embodiment consistent with the invention is a method of transcribing language into woven fabrics that may include selecting a passage or even just a word to transcribe into woven fabric; determining what letter is to be transcribed first. The Braille representation of that letter must be determined and knowing which dots are raised in each Braille cell representing the letter, one may then move one or more levers connected to harnesses of a loom, which correspond to the raised dots present in the Braille cell to be transcribed. The movement of the lever raises the harness which by way of threaded heddles, separates the warp threads. The levers are preferably ordered to match the order of the six keys a Perkins Brailler that create the raised dots of a Braille cell. The levers are preferably ordered to match the order of the six keys a Perkins Brailler that create the raised dots of a Braille cell. A shuttle with weft thread is passed through the shed created by the separated warp threads, weaving a pattern that is a transcription of the Braille cell. This process is repeated for each letter in the each word to be transcribed until all letters in the word have been transcribed into woven fabric.

Such a method may also encode a message into woven fabric. Only if the threading pattern is known may the message be decoded from the woven fabric.

As described with previous embodiments, an intermediate weaving pattern may be used between the weft threads woven according to the transcribed Braille cell.

An embodiment consistent with a method of practicing typing Braille may include selecting a letter, contraction, or short form word or a punctuation, music or mathematical symbol to practice typing in Braille. The exact dots that are raised in the one or more Braille cells that express the letter or symbol must be determined, either from memory or from a conversion table. Using a loom with seven levers and harnesses, with the levers ordered and positioned to match the six keys and space bar of a Perkins Brailler, one may move the one or more levers connected to a shaft. The levers that are moved correspond to keys that would be pressed on a Perkins Brailler to created the raised dots present in the Braille cell to be "typed." The lever raises the harness, which raises all threaded heddles connected to it. Moving the lever causes the warp threads in the heddles to separate from the remaining warp threads according to the chosen pattern. One then passes a shuttle with the weft thread through the shed formed by the separated warp threads at least one way, one time. As many passes as are desired or are instructed may be conducted. One may then release the chosen lever(s) and select another set of levers to move to raise the corresponding harnesses to practice typing the next Braille cell, and pass the shuttle with the weft thread through the shed created by the separated warp threads at least one way, one time.

If desired, an intermediate weaving pattern lever may be secured and a weft thread woven in that pattern by being passed through the shed created by the separated warp threads at least one way, one time, between the weft threads woven in the patterns corresponding to the Braille cells. This may be done in order to demarcate the weft thread(s) woven in the pattern corresponding to the Braille cells for ease of detecting whether each woven "Braille cell" is correct or not or to create a desired pattern. It is preferred that this intermediate weaving pattern is an additional weaving pattern created by a seventh (or greater) lever, harness and corresponding heddles, so that its pattern is not confused with a weaving pattern corresponding to a Braille cell.

Each exemplary method above, if repeated will create a fabric. If set threading patterns for heddles and ordering of harnesses connected to levers is followed, a particular pattern may be observed and recreated on any loom by following a set of instructions or Braille cells giving the sequence of levers to be used with the corresponding number of times the weft thread is woven before changing to another set of levers. Each new music piece, or written composition will create a new pattern of woven fabric.

Other embodiments consistent with the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A loom for practicing typing in Braille, comprising:
   a loom frame for supporting a plurality of warp threads,
   a plurality of heddles, each heddle having an opening through which at least one of the plurality of warp threads may be threaded;
   seven harnesses, each of the seven harnesses with at least one of the plurality of heddles being attached thereto and arranged to be raised and lowered relative to the loom frame;
   seven levers, each of the levers being attached to one of the seven harnesses for raising and lowering the harness, wherein a movement of a lever causes the harness and the at least one heddle attached thereto to be raised, separating the at least one warp thread, when threaded through the opening of the at least one heddle, from the remainder of the warp threads, thereby creating a shed therebetween, and wherein the seven levers are arranged in a row with a center lever, the center lever having a width greater than any other one of the seven levers; and a shuttle having a weft thread wound thereon and arranged to be passed through the shed.

2. The loom of claim 1 wherein the loom frame includes a top, and the seven levers are mounted on the top.

3. The loom of claim 1, wherein:
the plurality of warp threads are arranged on the loom frame from left to right, and a first one of the seven levers, when moved, separates a first warp thread from the left and every seventh successive warp thread from the left from the remainder of the warp threads;
a second one of the seven levers, when moved, separates a second warp thread from the left and every seventh successive warp thread from the left from the remainder of the warp threads;
a third one of the seven levers, when moved, separates a third warp thread from the left and every seventh successive warp thread from the left from the remainder of the warp threads;
a fourth one of the seven levers, when moved, separates a fourth warp thread from the left and every seventh successive warp thread from the left from the remainder of the warp threads;
a fifth one of the seven levers, when moved, separates a fifth warp thread from the left and every seventh successive warp thread from the left from the remainder of the warp threads;
a sixth one of the seven levers, when moved, separates a sixth warp thread from the left and every seventh successive warp thread from the left from the remainder of the warp threads; and
the center lever of the seven levers, when moved, separates a seventh warp thread from the left and every seventh successive warp thread from the left from the remainder of the warp threads.

4. A loom for practicing typing in Braille, comprising:
a loom frame for supporting a plurality of warp threads,
a plurality of heddles, each heddle having an opening through which at least one of the plurality of warp threads may be threaded;
seven harnesses, each of the seven harnesses with at least one of the plurality of heddles being attached thereto and arranged to be raised and lowered relative to the frame;
exactly seven levers, each of the levers being attached to one of the seven harnesses for raising and lowering the harness, wherein a movement of a lever causes the harness and the at least one heddle attached thereto to be raised, separating the at least one warp thread, when threaded through the opening of the at least one heddle, from the remainder of the warp threads, thereby creating a shed therebetween, and wherein the seven levers are arranged in two groups of three levers each, the seventh lever being positioned between the two groups; and a shuttle having a weft thread wound thereon and arranged to be passed through the shed.

5. The loom of claim 4 wherein six of the seven levers are symmetrically disposed with respect to a lengthwise centerline of the seventh lever.

6. The loom of claim 4 wherein the seventh lever has a width at least as great as the width of a spacer bar of a Perkins Brailler.

7. The loom of claim 4 wherein the seventh lever has a width greater than a width of each of the six other levers.

8. The loom of claim 4 wherein the seven levers are spaced from each other in the same relative spacing as the six keys that produce the raised dots in a Braille cell and the center spacer bar of a Perkins Brailler.

9. The loom of claim 4, wherein the loom frame includes a top, and the seven levers are mounted on the top.

10. The loom of claim 4, wherein:
the plurality of warp threads are arranged on the loom frame from left to right, and a first one of the seven levers, when moved, separates a first warp thread from the left and every seventh successive warp thread from the left from the remainder of the warp threads;
a second one of the seven levers, when moved, separates a second warp thread from the left and every seventh successive warp thread from the left from the remainder of the warp threads;
a third one of the seven levers, when moved, separates a third warp thread from the left and every seventh successive warp thread from the left from the remainder of the warp threads;
a fourth one of the seven levers, when moved, separates a fourth warp thread from the left and every seventh successive warp thread from the left from the remainder of the warp threads;
a fifth one of the seven levers, when moved, separates a fifth warp thread from the left and every seventh successive warp thread from the left from the remainder of the warp threads;
a sixth one of the seven levers, when moved, separates a sixth warp thread from the left and every seventh successive warp thread from the left from the remainder of the warp threads; and
a seventh one of the seven levers, when moved, separates a seventh warp thread from the left and every seventh successive warp thread from the left from the remainder of the warp threads.

11. A method of practicing typing Braille comprising:
selecting a letter, contraction, short-form word, or a punctuation, music or mathematical symbol in Braille to "type";
determining which of the six possible dots is raised in the one or more Braille cells that express the letter, contraction, short-form word or symbol;
moving one or more levers connected to harnesses of a loom threaded with warp threads, which correspond to the raised dots present in the Braille cell to be "typed," the levers being ordered to match the order of the six keys a Perkins Brailler that create the raised dots of a Braille cell, thereby creating a space between the warp threads that are separated from the remainder of the warp threads when the lever is moved; and
passing a shuttle with a weft thread wound thereon through the space between the separated warp threads.

12. A method of transcribing a musical composition into woven fabric comprising:
selecting a musical composition to transcribe into woven fabric;
determining what note is to be transcribed;

determining which of the six possible dots is raised in each Braille cell representing the musical note;

moving one or more levers connected to harnesses of a loom threaded with warp threads, which correspond to the raised dots present in the Braille cell to be transcribed, the levers being ordered to match the order of the six keys of a Perkins Brailler that create the raised dots of a Braille cell; thereby creating a space between the warp threads that are separated from the remainder of the warp threads when the lever is moved;

passing a shuttle with a weft thread wound thereon through the space between the separated warp threads; and repeating the above three steps for the next note to be transcribed.

13. A method of transcribing language into woven fabrics comprising:

selecting a word to transcribe into woven fabric;

determining what letter, contraction or short-form word is to be transcribed first;

determining which of the six possible dots is raised in each Braille cell representing the letter, contraction or short-form word;

moving one or more levers connected to harnesses of a loom, which correspond to the raised dots present in the Braille cell to be transcribed the levers being ordered to match the order of the six keys a Perkins Brailler that create the raised dots of a Braille cell; thereby creating a space between the warp threads that are separated from the remainder of the warp threads when the lever is moved;

passing a shuttle with a weft thread wound thereon through the space between the separated warp threads; and repeating the above three steps for the next letter to be transcribed until all letters in the word have been transcribed into woven fabric.

14. A method of encoding a message into woven fabric comprising:

selecting a message to encode into woven fabric;

determining what character is to be encoded;

determining which of the six possible dots is raised in each Braille cell representing the character;

moving one or more levers connected to harnesses of a loom, which correspond to the raised dots present in the Braille cell to be encoded, the levers being ordered to match the order of the six keys a Perkins Brailler that create the raised dots of a Braille cell, thereby creating a space between the warp threads that are separated from the remainder of the warp threads when the lever is moved;

passing a shuttle with a weft thread wound thereon through the space between the separated warp threads; and repeating the above three steps for the next character to be encoded.

15. A method of teaching Braille comprising:

presenting the numbering system of the six raised dots in a Braille cell;

selecting one or more characters of which to teach the Braille representation;

presenting the numbers of the raised dots present in each Braille cell representing the one or more characters;

instructing a student to move one or more levers on a loom that correspond to the raised dots in a first Braille cell presented;

instructing the student to pass a shuttle holding a weft thread through the separated warp threads at least once; and repeating the above two instructions for any subsequent Braille cell needed to represent the selected one or more characters.

16. The method of claim 15 wherein the selected characters are the alphabet.

17. The method of claim 15 wherein the selected characters are the letters of the alphabet in order and separated by one or more weft threads woven using a harness not connected to one of the levers corresponding to the six raised dots of a Braille cell.

18. The method of claim 16 wherein the student is instructed to pass the shuttle with weft thread a set number of times before moving other levers.

19. A fabric made by the method of any of the claims 11–18.

20. A fabric made on a loom of any of the claims 1–10.

* * * * *

UNITED STATES PATENT AND TRADEMARK OFFICE
CERTIFICATE OF CORRECTION

PATENT NO. : 7,021,340 B2
APPLICATION NO. : 10/895876
DATED : April 4, 2006
INVENTOR(S) : Jennifer J. Mayster It is certified that error appears in the above-identified patent and that said Letters Patent is hereby corrected as shown below:

Col. 2, line 6: "down an under," should be "down and under"

Col. 2, line 10: "*Ward*" should be "*Warp*"

Col. 2, lines 10, 11, 31, and 47: "LeClerc" should be "Leclerc"

Col. 3, lines 29 and 51: "LeClerc" should be "Leclerc"

Col. 4, line 27: "lever 22" should be "lever 34"

Col. 4, line 29: "lever 24" should be "lever 36"

Col. 4, line 32: "lever 26" should be "lever 38"

Signed and Sealed this

Seventh Day of November, 2006

JON W. DUDAS
*Director of the United States Patent and Trademark Office*